C. T. SEWELL.
ADJUSTING DEVICE FOR PLOW FENDERS.
APPLICATION FILED JUNE 25, 1913.
1,096,322.
Patented May 12, 1914.
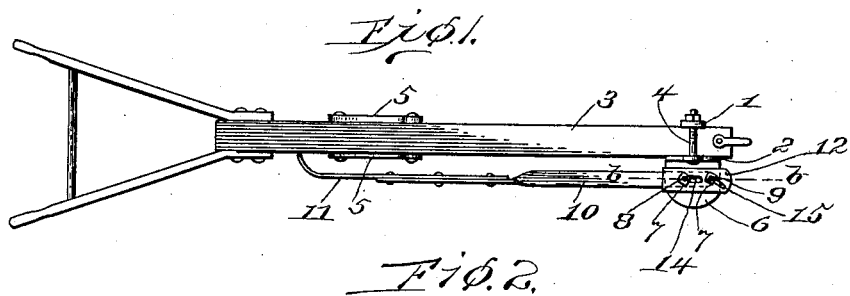
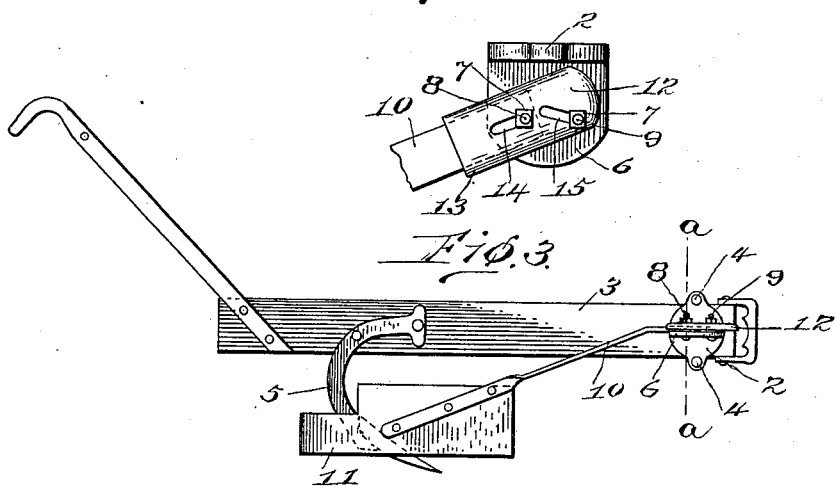
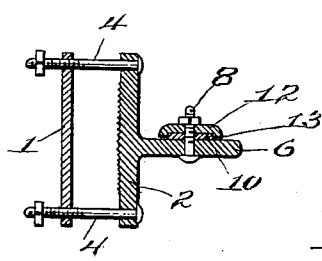
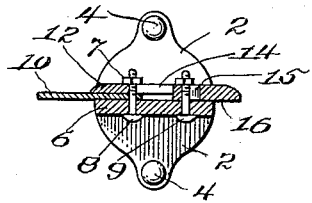
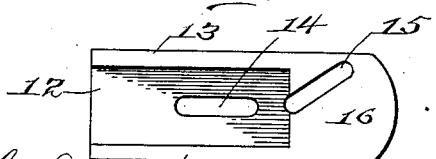
WITNESSES:
J. M. Fowler Jr.
R. F. Lansdale
INVENTOR
Charles T. Sewell
BY C. J. Beer
ATTORNEY

UNITED STATES PATENT OFFICE.

CHARLES T. SEWELL, OF NEWNAN, GEORGIA.

ADJUSTING DEVICE FOR PLOW-FENDERS.

1,096,322.   Specification of Letters Patent.   Patented May 12, 1914.

Application filed June 25, 1913. Serial No. 775,635.

*To all whom it may concern:*

Be it known that I, CHARLES T. SEWELL, a citizen of the United States, residing at Newnan, in the county of Coweta and State of Georgia, have invented certain new and useful Improvements in Adjusting Devices for Plow-Fenders, of which the following is a specification.

This invention relates to plow attachments, and pertains especially to means for attaching and adjusting fenders.

The object of the invention is to provide a plow-beam clamp with novel and peculiar means for suspending and adjusting a plow fender laterally with respect to the plow without disconnecting the fender with the clamp or the latter with the plow beam.

The invention consists in the novel construction and arrangement of certain parts, and essentially in a pivotally slidable bar for swinging the fender.

In the accompanying drawings forming part of this application:—Figure 1 is a top view illustrating the application of the invention to an ordinary plow. Fig. 2 is a top view showing the adjustment. Fig. 3 is a side elevation. Fig. 4 is an enlarged cross section taken on the plane indicated by the dotted line *a—a*, Fig. 3. Fig. 5 is an enlarged section taken on the plane indicated by the dotted line *b—b* Fig. 1. Fig. 6 is an inverted detail plan view of the adjusting bar.

The same reference characters denote the same parts throughout the several views of the drawings.

The plow shown in the drawings is merely used to exemplify the invention, and the plow-beam clamping device is practically the same as that covered by my patent of December 6, 1910, No. 977,971. Therefore the said parts will only be hereinafter referred to for the purpose of carrying out the invention now to be described in detail.

The clamping device consists of the members 1 and 2 adapted to be secured to a plow beam 3 by bolts 4, and said beam has a suitable plow standard 5 secured thereto. Obviously the clamping device may be adjusted lengthwise the beam by loosening the clamping members 1 and 2. The clamping member 2 has a lateral wing 6 extending at right angles thereto, and is provided with two bolts 8 and 9 having suitable nuts 7. The bolts are off set from each other parallel with the clamping member 2 and with the beam 3, for purposes hereinafter fully explained, and the bolt 8 passes through the spring arm 10 of the fender 11. The arm 10 fits into the bottom of the adjusting bar 12 between side flanges 13 of said bar, and said arm is pivoted on the wing 6 by the bolt 8. A longitudinal slot 14 is made through the bar 12, for the bolt 8, and a slot 15 is made through the front end of the bar 12, at an angle to the slot 14, for the bolt 9. The slot 15 extends from adjacent to the front end of the slot 14 toward the front outer corner of the bar and terminates adjacent to the front outer edge of the bar. The top of said bar is preferably convexed for the purpose of giving the bar strength and durability.

It will be observed that the fender arm seat in the bar extends only to the end walls of the slot 15, so that this end of the bar is of full thickness and forms a bearing surface 16, on the wing 6, and that said seat is deep enough to leave the under side of the fender arm projecting slightly beyond the flanges 13, so as to more firmly clamp the fender arm to the wing 6.

It will be understood that the bar 12 is slid upon the bolts 8 and 9 and upon the arm 10, which is carried by the bar in every movement of the latter, for adjusting the fender to various positions relative to the plow point; that the arm, the bar, and the wing are not disconnected for said adjustment; and that the bolts and nuts are not removed for such adjustment.

Obviously the slots may be made longer and the angle slot may extend entirely across the end of the longitudinal slot for the purpose of affording a greater latitude in the swing or adjustment of the fender. Other mechanical variations may be made in the device without departing from the spirit of the invention according to the appended claims.

Having thus described my invention what I claim as new and desire to secure by Letters Patent is:—

1. The combination with a plow-beam clamp having a lateral wing, a pair of bolts carried by the wing, and a fender arm pivoted on one of said bolts, of a bar fitting the said arm and having a longitudinal slot for the pivot bolt and a slot for the other of said bolts at an angle to the longitudinal slot.

2. The combination with a plow-beam having a lateral wing, a pair of bolts projecting from the wing and spaced apart parallel with the beam, and a fender arm pivoted on one of said bolts, of an adjusting bar slidably fitting said arm and having a longitudinal slot for the pivot bolt and a slot extending at an angle to the longitudinal slot for the other of said bolts.

3. In means for adjusting plow fenders, a bar having a seat for the fender arm, a pair of slots in the bar at an angle to each other, bolts extending through the slots for pivotally and slidably connecting the bar with the arm and for pivoting the arm, and means for fixing the bolts relative to the plow-beam.

In witness whereof I hereunto set my hand in the presence of two witnesses.

CHARLES T. SEWELL.

Witnesses:
ANNIE WILL REDWINE,
ROLAND M. JONES.

---

Copies of this patent may be obtained for five cents each, by addressing the "Commissioner of Patents, Washington, D. C."